United States Patent
Al-Mutairi et al.

(10) Patent No.: US 9,587,165 B2
(45) Date of Patent: Mar. 7, 2017

(54) NON-DAMAGING BIMODAL STIMULATION COMPOSITION AND METHOD OF USE THEREOF

(75) Inventors: Saleh Haif Al-Mutairi, Dhahran (SA); Abdul Hameed Mohsen, Al Khobar (SA); Mubarak A. Al-Dhufairi, Tanajib (SA); Ali D. Al-Aamri, Dhahran (SA)

(73) Assignees: SAUDI ARABIAN OIL COMPANY (SA); SCHLUMERGER SAUDI ARABIA (SA)

( * ) Notice: Subject to any disclaimer, the term of this patent is extended or adjusted under 35 U.S.C. 154(b) by 828 days.

(21) Appl. No.: 12/906,409

(22) Filed: Oct. 18, 2010

(65) Prior Publication Data

US 2012/0094878 A1 Apr. 19, 2012

(51) Int. Cl.
    *C09K 8/52* (2006.01)
    *C09K 8/524* (2006.01)
    *C09K 8/60* (2006.01)
    *C09K 8/72* (2006.01)

(52) U.S. Cl.
    CPC .............. *C09K 8/524* (2013.01); *C09K 8/602* (2013.01); *C09K 8/72* (2013.01); *C09K 2208/30* (2013.01)

(58) Field of Classification Search
    CPC ........ E21B 43/267; E21B 43/04; E21B 43/26; E21B 43/08; E21B 21/003; E21B 43/088; E21B 47/1015; E21B 33/138; E21B 34/14; E21B 43/121; E21B 43/16; E21B 43/24; E21B 43/247; E21B 43/261; E21B 47/09; C09K 8/584; C09K 2208/08; C09K 2208/18; C09K 8/56; C09K 8/035; C09K 8/508; C09K 8/512; C09K 8/572; C09K 8/92; C09K 2208/10; C09K 2208/26; C09K 2208/28; C09K 8/42; C09K 8/502; C09K 8/5045; C09K 8/52; C09K 8/602; C09K 8/70; C09K 8/82; C09K 2208/00; C09K 8/03; C09K 8/524; C09K 8/588; C09K 8/62; C09K 8/66; C09K 8/665; C09K 8/68; C09K 8/72; C09K 8/76; C09K 8/88; C09K 8/885
    See application file for complete search history.

(56) References Cited

U.S. PATENT DOCUMENTS

| | | | |
|---|---|---|---|
| 6,399,546 B1 | 6/2002 | Chang et al. | |
| 6,482,866 B1 * | 11/2002 | Dahayanake | A61K 8/02 |
| | | | 252/77 |
| 6,703,352 B2 | 3/2004 | Dahayanake et al. | |
| 6,903,054 B2 | 6/2005 | Fu et al. | |
| 7,125,825 B2 | 10/2006 | Moss | |
| 7,207,388 B2 | 4/2007 | Samuel et al. | |
| 7,288,505 B2 | 10/2007 | Chang et al. | |
| 7,341,107 B2 | 3/2008 | Fu et al. | |
| 7,378,378 B2 | 5/2008 | Chen et al. | |
| 7,387,986 B2 | 6/2008 | Chen et al. | |
| 7,399,732 B2 | 7/2008 | Allan et al. | |
| 7,402,549 B2 | 7/2008 | Chen et al. | |
| 7,507,693 B2 | 3/2009 | Chen et al. | |
| 2002/0033260 A1 * | 3/2002 | Lungwitz | B01F 17/0042 |
| | | | 166/278 |
| 2004/0045710 A1 * | 3/2004 | Fu | C09K 8/602 |
| | | | 166/282 |
| 2006/0081370 A1 * | 4/2006 | Fu | C09K 8/602 |
| | | | 166/279 |
| 2008/0051301 A1 | 2/2008 | Chen et al. | |
| 2008/0066916 A1 * | 3/2008 | Li | C09K 8/602 |
| | | | 166/305.1 |
| 2008/0167205 A1 | 7/2008 | Chen et al. | |
| 2008/0169102 A1 | 7/2008 | Carbajal et al. | |
| 2008/0169103 A1 | 7/2008 | Carbajal et al. | |
| 2008/0194427 A1 | 8/2008 | Welton et al. | |
| 2009/0151944 A1 * | 6/2009 | Fuller | C09K 8/536 |
| | | | 166/280.2 |

FOREIGN PATENT DOCUMENTS

| | | |
|---|---|---|
| WO | 9856497 | 12/1998 |
| WO | WO98/56497 | * 12/1998 |

OTHER PUBLICATIONS

International Search Report and Written Opinion issued in PCT Application No. PCT/US2011/055879, dated Dec. 23, 2011 (12 pages).

* cited by examiner

*Primary Examiner* — Kumar R Bhushan
(74) *Attorney, Agent, or Firm* — Bracewell LLP; Constance Gall Rhebergen

(57) ABSTRACT

A method and apparatus for a bimodal stimulation composition for removal of thickness of a filter cake while minimizing fluid loss is provided. The bimodal stimulation composition includes water, a salt, an acid, and a viscoelastic surfactant.

3 Claims, 4 Drawing Sheets

NON-DAMAGING BIMODAL STIMULATION COMPOSITION AND METHOD OF USE THEREOF

FIELD OF THE INVENTION

This invention relates to a method and composition for treating a well bore. More specifically, the invention relates to a fluid composition and method of using the composition for the removal of filter cake material in a wellbore for optimizing production from a surrounding hydrocarbon bearing formation.

BACKGROUND OF THE INVENTION

During well operations, drilling fluids can be lost into the surrounding formation. To prevent this, the fluid is frequently modified such that a small amount of the fluid and solids contained therein form a coating on the wellbore surface (often referred to as a "filter cake"). After the completion of drilling operations, the coating or filter cake is typically removed, and production from the formation can proceed. The process used to remove the filter cake can also be used to remove other types of damage or debris from the wellbore prior to beginning production.

"Stimulation" refers to processes that can be used to increase the net permeability of a formation or reservoir. Some exemplary known stimulation techniques include: (1) injection of chemicals into the wellbore to react with and dissolve conditions limiting production (e.g., scale, filter cake); (2) injection of chemicals through the wellbore and into the formation to react with and dissolve portions of the formation, or to create alternative flow paths for recoverable hydrocarbons; and (3) injection of chemicals through the wellbore and into the formation at pressures sufficient to cause fractures in the formation, thereby creating a flow channels through which hydrocarbons can more readily move from the formation into the wellbore.

In particular, methods to enhance the productivity of hydrocarbon wells by removing near-wellbore formation damage or by creating alternate flow paths by fracturing and/or dissolving small portions of the formation at the fracture face are respectively known as "matrix acidizing," and "acid fracturing." In general, acids, or acid-based fluids are useful in this regard due to their ability to dissolve both formation minerals (e.g., calcium carbonate) and contaminants (e.g., drilling fluid coating the wellbore or that has penetrated into the formation) introduced into the wellbore/formation during drilling or remedial operations.

The removal of filter cake and scale deposits and fluid placement are key concerns in well completion operations. Known prior art techniques involve multiple step processes, which can be costly and time consuming. For example, in one typical prior art application, during completion operations, the process of treating a wellbore may include the repeated addition of an additive (such as an acid or a diverter); followed by the addition of a spacer, and wherein the addition steps may be repeated until all of the required treatments have been finished. The use of high activity acids, such as hydrochloric acid, may also require the use of methods and equipment specific to matrix acidizing, as opposed to other types of injection, thus requiring specific equipment. Matrix acidizing, as described above, is a stimulation method known solely for the purpose of enhancing productivity.

One of the difficulties encountered with traditional matrix acidizing in rig operations is that the formation, particularly high permeability formations, encounter severe circulation loss after the well is acidized using traditional compositions. Thus, removal of the filter cake in highly permeable formations using matrix acidizing techniques can alleviate filter cake issues while at the same time creating a new problem that must be separately addressed. It is desirable to avoid any lost circulation during stimulation of the well. If there is circulation loss during stimulation of the well, typically, rig operations must be stopped, and separate measures must be taken to stop the circulation loss. Loss circulation is typically only a problem when the rig is onsite and the drill pipe is used to place acid into the wellbore as drilling rig pumps typically cannot supply enough fluid to the wellbore if the losses to the formulation are large.

The use of viscoelastic surfactants ("VES") is known in the petroleum industry for providing controllable fluid viscosity that can be easily broken by hydrocarbons, and which leaves little or no residue after treatment. The exact mechanism of viscoelastic surfactants is understood to involve the formation of rod like micelles upon a change in the environment, such as the pH, salinity, temperature, or other property or condition of the environment. With certain cationic VES fluids, it is typical for the VES to be consumed during the operation such that viscosity of the transport fluid is only temporarily affected, at which point the viscosity modification effects of the VES are lost, VES fluids suffer the drawback, however, of being unable to prevent the fluid loss problems noted above with respect to matrix acidization. For this reason, the VES fluids typically must be combined with fluid loss control agents, such as magnesium oxide, where the particles of the fluid loss control agent appear to associate with the VES micelles to limit the VES fluid flow into the porous media of the formation. Common fluid loss control agents for use with VES are solid particulates.

In oil production operations, it is at times necessary to both remove filter cake and prevent or minimize fluid losses, especially during well stimulation, particularly when using a drill pipe for introducing the well stimulation fluids. Typically, separate fluids are required for fluid loss prevention and for the removal of filter cake. Thus, it would be advantageous to use a single bimodal composition capable to both prevent fluid loss and remove filter cake.

SUMMARY

The current invention provides a bimodal stimulation composition and method for administering of the bimodal stimulation composition to a wellbore for the controlled removal of filter cake, while at the same time maintaining viscosity of the bimodal stimulation composition in a range appropriate for fluid loss prevention. The bimodal stimulation composition creates an extended reaction time and slower rock dissolving effects, while the high viscosity of the bimodal stimulation composition will prevent it from reacting with the filter cake materials and invading the formation. The high viscosity of the bimodal stimulation composition will, by itself, reduce fluid losses while the filter cake is being gradually removed.

In one embodiment, the bimodal stimulation composition for use in the wellbore for controlled removal of filter cake present in a target production zone, as well as for fluid loss prevention, includes an acid, a viscoelastic surfactant, and a brine. The combination of the acid, viscoelastic surfactant, and brine, when delivered to the target production zone, is operable to remove filter cake in the target production zone over an extended reaction time. Also, the viscosity of this bimodal stimulation composition increases as a result of the reaction, which thereby limits the reaction rate and the loss of fluids.

In one embodiment, the viscoelastic surfactant is based upon zwitterionic surfactants. In another embodiments, the viscoelastic surfactant is based upon amphoteric surfactants.

In one aspect, the present invention relates to a method of treating a hydrocarbon-containing formation. The method includes the step of administering the composition to the formation and allowing the composition to react with the formation for an amount of time sufficient to dissolve a significant or desired portion of filter cake disposed about the wall of the wellbore. Delivery of the composition to the target zone of a reservoir or formation can be by rig pipe or coiled tubing unit (CTU).

In one aspect, the present invention relates to a reservoir treatment fluid for use in a hydrocarbon-containing formation including a bimodal stimulation composition for use in a wellbore for controlled removal of filter cake present in a target production zone and for fluid loss prevention. The bimodal stimulation composition includes an acid, a viscoelastic surfactant, and a brine. In certain embodiments, the viscoelastic surfactant is based upon zwitterionic surfactants. In other embodiments, the viscoelastic surfactant is based upon amphoteric surfactants. The bimodal stimulation composition is delivered to the target production zone where it is desirable to remove or decrease the thickness of the filter cake or other debris. The bimodal stimulation composition remains in contact with the filter cake or debris over an extended reaction time such that at least a portion of the filter cake is removed. Advantageously, the viscosity of the bimodal stimulation composition increases as a result of the reaction and limits the reaction rate and corresponding fluid loss. Thus, the bimodal stimulation composition does not substantially increase fluid loss into the production zone.

In one embodiment, the acid of the bimodal stimulation composition is either a weak acid, such as formic, citric, lactic or acetic acid, or a dilute strong acid, such as hydrochloric or hydrofluoric acid, or a combination of the two such that the pH of the acid is that of a weak acid, the pH being in a range of 0 to 5.

The brine of the bimodal stimulation composition can be selected from a groups consisting of solution of sodium chloride, potassium chloride, ammonium chloride, calcium chloride, calcium bromide, zinc halide or other brines available in the field. Completion fluid can be used as the brine of the bimodal stimulation. In a preferred embodiment, the brine is present in the bimodal stimulation composition in an amount and concentration such that the bimodal stimulation composition has a salt concentration of between about 0.5% by weight to about 10% by weight.

The invention also includes a method for the controlled removal of filter cake from the target production zone of the wellbore penetrating a subterranean formation of hydrocarbons. The method includes the steps of delivering the bimodal stimulation composition to the target production zone such that the bimodal stimulation composition contacts the filter cake for extended reaction time. During the extended reaction time, the bimodal stimulation compositions act to remove filter cake. Simultaneously, the bimodal stimulation composition acts to control fluid loss from the wellbore into the target production zone. In one embodiment of the method, the acid of the bimodal stimulation composition is either a weak acid, such as formic, citric, lactic, or acetic acid, or a dilute strong acid, such as hydrochloric acid or hydrofluoric acid, or a combination of the two such that the pH of the acid is that of a weak acid, the pH being in a range of 0 to 5.

In another embodiment a method for treating a target production zone of a hydrocarbon bearing reservoir is provided. The method includes the steps of delivering a bimodal stimulation composition to the hydrocarbon bearing formation, such that the bimodal stimulation composition contacts a filter cake or the hydrocarbon bearing formation. The bimodal stimulation composition includes an acid, a viscoelastic surfactant, and a brine. Contacting the filter cake or the formation with the bimodal stimulation composition results in at least one of the controlled removal of the filter cake or increased hydrocarbon production from the reservoir.

In certain embodiments, the acid is selected from formic acid, lactic acid, citric acid, acetic acid, hydrochloric acid, or hydrofluoric acid, the viscoelastic surfactant is selected from a zwitterionic or amphoteric compound, and the brine is present in the bimodal stimulation composition such that the composition has an ionic concentration in a range of between about 0.5% by weight and about 10% by weight. Upon contacting the formation, the bimodal stimulation composition forms a gel.

DETAILED DESCRIPTION OF THE INVENTION

Figure 1:
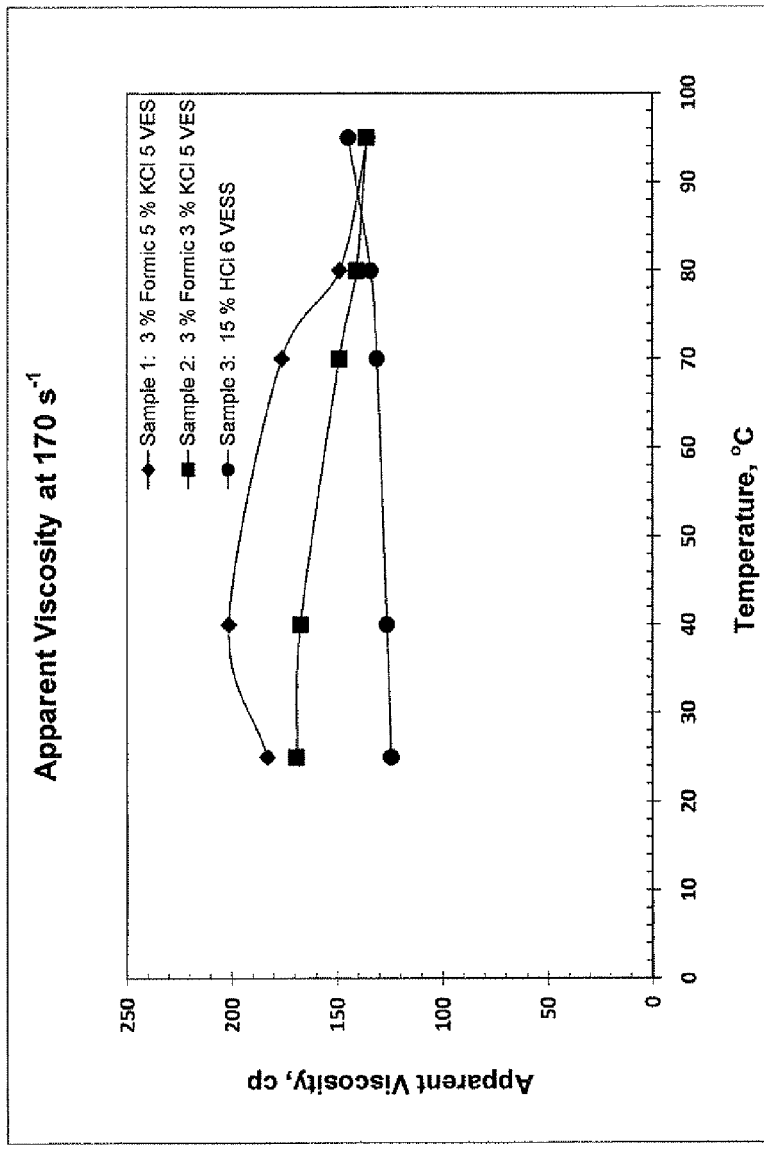
FIG. 1 provides a graph showing viscosity of a bimodal stimulation composition according to various embodiments of the present invention as a function of temperature.

Although the following detailed description contains many specific details for purposes of illustration, it is understood that one of ordinary skill in the art will appreciate that many examples, variations and alterations to the following details are all within the scope and spirit of the invention. Accordingly, the exemplary embodiments of the invention described herein are set forth without any loss of generality, and without imposing limitations, relating to the claimed invention.

The present invention addresses problems associated with prior art methods and compositions used for the treatment of wellbores and provides bimodal stimulation compositions and method of use thereof. The improved bimodal stimulation compositions described herein generally include water, salt, a viscoelastic surfactant, and an acid. The composition fluids slow the reaction rate of acid with filter cake, thereby enabling the slow and uniform removal of filter cake from wellbores of horizontal wells, without causing further damage to the formation and without uncontrolled circulation loss. In highly permeable formations, the bimodal stimulation composition of the present invention can be spotted after completing drilling to acidize and control fluid loss simultaneously. Therefore, in certain embodiments, a combination of filter cake cleanup and fluid loss control can be accomplished in one step as a result of the bimodal nature of the bimodal stimulation compositions of the present invention. The slow process of removing the filter cake and controlling lost circulation enables the removal of the drillstring and safe insertion of the permanent production tubing string.

As used herein, "filter cake" refers to an accumulation of particulate matter that is deposited on a permeable medium when a slurry, such as a drilling fluid, is forced against the permeable medium under pressure. As the liquid filtrate passes through the filter, a cake forms on the medium. The filter cake buildup can, from time to time, cause problems during drilling operations, such as causing a stuck pipe. Similarly, poor filter cake frequently allows deep filtrate invasion, which can damage a reservoir and results in reduced oil and/or gas production. During drilling operations, a certain degree of filter cake buildup is desirable to isolate and protect a producing formation from drilling fluids. The thickness of filter cake buildup can be controlled in the manner identified by removing a portion of the filter cake, as may be necessary from time to time. The expression removal of filter cake is understood to refer to either a partial or complete removal of filter cake.

In one aspect, the present invention is directed to the bimodal stimulation composition for the controlled removal of filter cake that accumulates in the wellbore of wells, particularly horizontal wells. In another aspect, the present invention provides a bimodal acid composition for the simultaneous controlled removal of the filter cake and control of fluid loss. Advantageously, the compositions of the present invention described herein have either slow reaction rates, or slow the reaction rates such that upon contacting the filter cake, removal thereof is controlled and uniform. In certain embodiments, the removal of the filter cake takes place over a period of at least about 24 hours, alternately over about a 48 hour period, preferably up to about a 96 hour period. The noted rates of removal of the filter cake allow for removal of the drilling string and safe insertion of the production string.

In certain other embodiments, the compositions of the present invention can be used to control or adjust the viscosity of the wellbore fluids. For example, in certain embodiments, the viscosity of the solution can be controlled or adjusted by either increasing or decreasing the concentration of the brine. Alternately, the viscosity can be controlled or adjusted by increasing or decreasing the pH of the bimodal stimulation composition.

In general, viscoelastic surfactants are used within the petroleum industry for well stimulation treatments, typically either for matrix acidizing or for formation fracturing. Viscoelastic surfactants are known in the art as being useful for temporarily increasing the viscosity of fluids and allowing for the suspension of particles. The property of viscoelasticity is known within the oil and gas industry.

Viscoelasticity is believed to be caused by a different type of micelle formation than the spherical micelles that are formed by most surfactants. Viscoelastic surfactant fluids form worm-like, rod-like or cylindrical micelles in solution, which in turn create useful rheological properties. Viscoelastic surfactant solutions exhibit shear thinning behavior, and remain stable despite repeated high shear applications. By comparison, typical polymeric thickeners irreversibly degrade when subjected to high shear.

Viscoelastic diverting acids ("VDAs") are polymer-free self-diverting matrix stimulants based upon viscoelastic surfactants. VDAs have the ability to modify in-situ fluid viscosity. Specifically, as the acid component of the VDA becomes spent and produces salty water with relatively higher pH and salt concentration (typically calcium), the VES becomes more viscous. Similarly, when the VDA contacts a hydrocarbon, the VES becomes less viscous or thins. Advantages of these properties can include enhanced production by increasing zonal coverage in multi-zone reservoirs and extended intervals. By thickening or increasing viscosity upon contact with carbonate, the VES thereby prevents the treatment fluid from permeating the heel area and carries the additive deeper into the horizontal section. In vertical wells, the VES can allow all zones of varying permeability to be effectively stimulated. Viscosity buildup is the result of the acid becoming spent, which results in an increase of the pH and an increase of the salt concentration. Advantageously, fresh VDA or VES that is added to the wellbore does not immediately decrease in viscosity when it enters a water zone, as is the case when it comes into contact with hydrocarbon. Therefore, the water zones or zones that have been acidized and are saturated with spent acid will become more viscous, which in turn diverts fresh VDA to hydrocarbons present in the oil zones.

Self diverting acid is a term given to a class of compounds that exhibit reversible gelling behavior, that is, the fluid can be made to gel, then deliberately be un-gelled as needed. The ability to controllably gel and un-gel the fluid can be beneficial in fluid placement. By forming a gel upon reaction of the acid with the formation, the VDA prevents additional, unneeded acid from entering the treated zones in the formation.

In certain embodiments of the present invention, the VDA can include a mixture of (1) a surfactant from a particular family of zwitterionic viscoelastic surfactants and (2) one or more mineral or organic acids (e.g., hydrochloric acid, hydrofluoric acid, sulfuric, phosphoric, formic, acetic, citric, lactic, maleic acids, and mixtures thereof), in either solid or liquid form. In certain embodiments, chelating agents can be used instead of, or in addition to, the mineral or organic acid. In other embodiments, such as for use in silicate formations, the acid can be a strong acid, such as hydrofluoric acid. In alternate embodiments, such as for use in a carbonate formation, the acid may be a weak acid or a dilute strong acid, because of the chelating effect calcium has on fluorine.

Generally, the viscoelastic surfactants are either ionic or nonionic. In certain embodiments, the bimodal stimulation composition of the present invention includes the use of aqueous viscoelastic surfactants based on zwitterionic surfactants. Zwitterionic surfactants have a permanently positively charged moiety, regardless of the pH, and a negatively charged moiety at alkaline pH. Alternately, the bimodal stimulation composition of the present invention can include the use of aqueous viscoelastic surfactants based upon amphoteric surfactants. Amphoteric surfactants are those that have both a positively charged moiety and a negatively charged moiety over a certain pH range (for example, slightly acidic), only a negatively charged moiety over a certain pH range (for example, slightly alkaline), and only a positively charged moiety over a certain pH range (for example, moderately acidic).

Suitable viscoelastic surfactants can be selected from betaines, such as erucylamidopropyl betaine (or a protonated, deprotonated, homolog or salt thereof). In certain embodiments, the betaine can include an ammonium functional group. In alternate embodiments, the betaine can include a phosphonium functional group.

In certain embodiments, the betaine-based viscoelastic surfactant can be a fatty amidoalkyl betaine. The betaine can be present in an amount between about 25% and about 75% by weight, alternatively between about 30% and 60% by weight. In certain embodiments, the viscoelastic surfactant can include an alcohol, wherein the alcohol is present in a range of between about 5 and 40% by weight, alternatively in a range of between about 10 and 30% by weight. In certain embodiments, the betaine can include an alcohol functional group can have between 2 and 4 carbon atoms.

The viscoelastic surfactants can be present in the VDA in an amount which, in combination with the other ingredients, is sufficient to form a viscoelastic fluid. In certain embodiments, the viscoelastic surfactant is present in a concentration of less than about 50% by weight of the fluid. In certain embodiments, the concentration of viscoelastic surfactant can range from about 0.5% to about 10% percent by weight of the fluid, more typically ranging from about 0.5% to about 8%, and even more typically ranging from about 0.5% to about 6%. In certain embodiments, the viscoelastic surfactant is present in an amount of between about 3 and 10% by volume, alternatively between about 3 and 6% by volume, or alternatively between about 6 and 10% by volume.

The acid can also include one or more members from the group of organic acids. Mixtures of the above members are specifically contemplated as falling within the scope of the invention. The acid component of the bimodal stimulation composition will typically be present in a minor concentration, e.g., less than about 20% by weight of the fluid, preferably less than about 10% by weight.

In certain embodiments, the acid component of the VDA can be an organic acid, such as a sulfonic acid or a carboxylic acid. The organic acid typically aids the development of increased viscosity which is characteristic of certain embodiments of the bimodal stimulation fluids of the present invention. Without wishing to be bound by any theory, it is believed that association of the organic acid or salt thereof with the micelle may decrease the aggregation curvature of the micelle and thus promotes the formation of a worm-like or rod-like micelle. The organic acid or salt thereof will typically be present in the VES fluid at a weight concentration of from about 0.1% to about 10%, alternatively from about 0.1% to about 7%, or alternatively from about 0.1% to about 6%.

Suitable salt solutions can include halides and sulfonates of alkaline and alkaline earth metals, such as, lithium, sodium, potassium, magnesium, calcium, and the like. Alternatively, the salt can include ammonium. Solutions can be prepared having concentrations up to and including a saturated solution. Typically, the salt solution has a concentration of between about 0.5 and 10% by weight of the salt component, alternatively between about 0.5 and 3% by weight, alternatively between about 3 and 6% by weight, alternatively between about 4 and 8% by weight, or alternatively between about 6 and 10% by weight. In other embodiments, natural brines can be utilized in the compositions described herein.

The inorganic salts that are particularly suitable for use in the bimodal stimulation fluids of the present invention include water-soluble potassium, sodium, and ammonium salts, such as potassium chloride and ammonium chloride. Alternatively, calcium and zinc halide salts can also be used. It is believed that the presence of inorganic salts may aid in the development of the increased viscosity, which can be characteristic of inventive fluids described herein. Further, the inorganic salt may assist in maintaining the stability of a geologic formation to which the fluid is exposed, or to which it is exposed. Formation stability, particularly clay stability (by inhibiting hydration of the clay), can be achieved at a relatively low concentration level, such as a few percent by weight, and as such the density of fluid is not significantly altered by the presence of the inorganic salt unless fluid density becomes an important consideration, at which point, heavier inorganic salts may be used. The inorganic salt will typically be present in the viscoelastic fluid at a weight concentration ranging from about 0.1% to about 30%, alternatively from about 0.1% to about 10%, or alternatively from about 0.1% to about 8%. Alternatively, the inorganic salt can be present in the VES fluids of the present invention at a concentration of about 20% by weight, alternatively up to about 15% by weight, alternatively up to about 12% by weight. Organic salts, such as trimethylammonium hydrochloride, tetramethylammonium chloride, and the like, can also be used in addition to, or as a replacement for, the inorganic salts described herein.

Suitable acids can be selected from weak acids or dilute strong acids. For example, in one embodiment, the acid can be a dilute strong mineral acid, such as dilute hydrofluoric (HF) or hydrochloric acid (HCl). Alternatively, the acid can be a weak acid, such as formic, citric, or lactic acid. In alternate embodiments, the acid can be acetic acid.

In another aspect, methods for preparing the above described compositions are provided. In a first method for preparing the bimodal stimulation fluid compositions described herein, a brine solution is provided having a desired salt concentration by dissolving solid salts in water. An acid can then be added to the brine in an amount to provide the desired acid concentration in the end product. Finally, the viscoelastic surfactant can be added to the brine/acid mixture in a desired concentration. The concentrations of the various components of the composition are determined based upon the total overall volume of the stimulation fluid.

In a second method for preparing the bimodal stimulation fluid compositions described herein, an acid is provided in a concentration sufficient to give a desired end concentration, when combined with the other elements of the fluid composition. A brine solution is then provided, wherein the brine solution is prepared by dissolving solid salts in water to provide an end solution having a particular salt concentration. Finally, the viscoelastic surfactant is added to the acid and brine mixture, in a desired concentration.

Preparation of the bimodal stimulation fluid compositions of the present invention preferably is done as a batch process on the surface (i.e., not prepared in-situ), and is then supplied to the formation or reservoir via the wellbore using the drill pipe, production tubing, CTU, to the annular space, or by other like means.

The addition of the salt in the brine to the solution initially increases the viscosity of the bimodal stimulation fluid, thereby slowing the reaction of the acid in the fluid with the filter cake. Slowing the reaction of the acid with the filter cake thus allows for the controlled removal of the filter cake. Reducing the rate of the filter cake removal, in turn, allows for the drilling equipment to be removed from the wellbore and production equipment to be installed in the wellbore, without significant circulation loss.

In addition to the water-soluble salts and thickening agents described hereinbefore, the bimodal stimulation fluids in the present compositions can optionally include additional chemical compounds or other additives, such as corrosion inhibitors, hydrogen sulfide scavengers, and the like.

In one embodiment of this invention, the surfactant can optionally be combined with some fluid-loss control additives known in the industry like water-soluble or waterdispersible polymers, such as guar and guar derivatives, xanthan, polyacrylamide, starch and starch derivatives, cellulosic derivatives, polyacrylates, polyDADMAC [poly(diallyl dimethyl ammonium chloride)] and combinations thereof, clay (Bentonite and attapulgite), in order to give fluid-loss control properties to the excavating fluid and contribute to the stabilization of the wall of the excavation.

General Process

To prepare the bimodal stimulation composition in accordance with one embodiment of the present invention, a surfactant is added to an aqueous solution into which has been dissolved a water-soluble inorganic salt, e.g. potassium chloride or ammonium chloride and/or at least one organic acid. Standard mixing procedures known in the art can be employed because heating of the solution and special agitation conditions are normally not necessary, although may be employed if necessary. Other agents may also be employed to solubilize the solution.

In certain embodiments, the compositions of the present invention are operable to reduce the rate of removal of the filter cake.

In other embodiments, the compositions of the present invention are operable to reduce the rate at which highly permeable formations are acidized.

The compositions of the present invention, in certain embodiments, prevent loss circulation while acidizing the wellbore In certain embodiments, a reservoir can be matrix acidized with certain embodiments of the bimodal stimulation compositions of the present invention, prior to completion of a well. As used herein, matrix acidizing refers to the treatment of a reservoir formation with a stimulation fluid that includes a reactive acid. Acidizing is typically employed to improve the formation permeability to increase production of reservoir fluids. In certain exemplary embodiments, such as sandstone formations, the acid may react with the soluble substances within the formation matrix to enlarge the pore spaces. Prior art matrix acidizing operations are preferably performed at a high rate, and treatment pressures that are below the fracture pressure of the formation, thereby enabling penetration of the acid while avoiding damaging of the reservoir.

In certain embodiments, such as for highly permeable formations, the bimodal stimulation fluids described herein can be delivered to the reservoir through the drillstring, while the drilling rig is on site. One known problem with current stimulation fluids that the present invention avoids is loss circulation during stimulation of a reservoir. Typically, during drilling operations, it is risky and undesirable to operate a drilling rig under conditions that may lead to high circulation loss, and efforts are typically made to limit high losses, including the use of heavy fluids (known as kill fluids), that prevent fluid circulation and additional loss. It is desired, however, that the use of kill fluids be kept to a minimum as the kill fluids can cause damage to the composition and limit the ability to inject subsequent fluids into the reservoir. However, use of the bimodal stimulation fluid of the present invention reduces the rate of reaction with the filter cake and thus does not immediately remove the filter cake. Instead, the slow reaction of the acid with the filter cake allows for the drilling operations to proceed with minimal losses and also allows for the drillstring to be removed from the wellbore, and be replaced with the production string, also with minimal loss. As the removal of the filter cake with the bimodal stimulation fluid composition of the present invention can take up to between about 48 and 96 hours, the removal of the filter cake proceeds slowly during the removal of the drillstring and replacement with the production string. Additionally, in certain embodiments, the bimodal stimulation fluid of the present invention can eliminate the need for the use of kill fluids.

In alternate embodiments, the bimodal stimulation fluid composition of the present invention can be supplied to a formation even if loss circulation is not an issue. Fluids of the present invention can be particularly useful when even distribution of the fluid into the wellbore is desired. In embodiments where circulation loss is not an issue, stimulation fluids according to the present invention can be applied.

In alternate embodiments, the bimodal stimulation fluid compositions of the present invention can be applied to the formation for normal stimulation treatments where the composition can be supplied to the formation by either coiled tubing or bullheaded through the drillstring. Applying the stimulation fluids in this manner can be used for better acid diversion and distribution, for removal of filter cake.

In certain embodiments, the bimodal stimulation compositions of the present invention can be supplied to a formation or reservoir as a plug.

EXAMPLES

The examples below show certain exemplary bimodal stimulation compositions, as described herein, which are then compared against a control composition that includes the viscoelastic gelling agent and a 20% by weight aqueous solution of HCl. As shown in Table 1, comparing Example 1 and Example 2, the addition of 5% by weight KCl to the composition increased viscosity from 72 cP to 96 cP, an increase of approximately 33%. Comparing Examples, 2 and 3, the effect of increasing the concentration of the viscoelastic gelling agent by 50% while simultaneously decreasing the acid concentration by approximately 30% is shown, wherein the decrease of acid and increase of viscoelastic gelling agent results in an increase of the viscosity from 96 cP to 186 cP, an increase of approximately 94%. The examples show a clear correlation that increasing the salt content or increasing the VES concentration result in increased viscosity.

TABLE 1

| Additive | Example 1 | Example 2 | Example 3 | Control |
|---|---|---|---|---|
| Fresh Water | 845 gal. | 0 | 0 | |
| 5% KCl brine | 0 | 850 gal. | 850 gal. | |
| Corrosion inhibitor | 10 gal. | 10 gal. | 10 gal. | |
| Chelating Agent | 30 lbs. | 30 lbs. | 30 lbs. | |
| H$_2$S scavenger | 5 gal. | 5 gal. | 5 gal. | |
| Demulsifier | 5 gal. | 5 gal. | 5 gal. | |
| Methanol | 10 gal. | 10 gal. | 10 gal. | |
| Formic Acid | 70 gal. | 70 gal. | 50 gal. | |
| Viscoelastic gelling agent | 50 gal. | 50 gal. | 75 gal. | |
| Properties | | | | |
| Viscosity (170 sec $^{-1}$) | 72 cP | 96 cP | 186 cP | 15 cP |

Qualitative analysis of Examples 1-3 were tested by combining approximately 10 g of coarse calcium carbonate salt (to simulate a reservoir) and 100 mL of each of the above noted compositions and the control, and heating each to a temperature of about 160° F. The control sample, which includes HCl (a strong acid), dissolved the calcium carbonate at a quicker rate than did the formic acid compositions, taking only about 1 hour to dissolve the solid calcium carbonate salt. In contrast, upon contact with the exemplary formic acid based systems described above in Examples 1-3, at least some of the calcium carbonate remained undissolved after more than 2 days. Additionally, in each of Examples 1-3, the composition remained viscous. The viscosity listed in the viscosity tested upon preparation of each composition. Examples 4-6 provided in FIG. 1 compare the viscosities for various compositions, at various different temperatures. The viscosities are all measured at the same shear rate of approximately 170 $sec^{-1}$. FIG. 1 provides the apparent viscosity of various compositions at various temperatures.

As shown in FIG. 1, in general, the viscosity of the compositions prepared according to the present invention decreases with increased temperature. Additionally, at temperatures greater than about 80° C., the viscosity of each of the different compositions are about equal. Sample 1 had a composition of about 3% by weight formic acid, 5% by weight KCl and 5% by weight viscoelastic surfactant. Sample 2 had a composition of about 3% by weight formic acid, 3% by weight KCl, and 5% by weight viscoelastic surfactant. Sample 3 had a composition of about 15% HCl and about 6% by weight of the viscoelastic surfactant. Relative to other compositions, increasing either the salt content or the concentration of the viscosifier results in increased viscosity.

Figure 2:
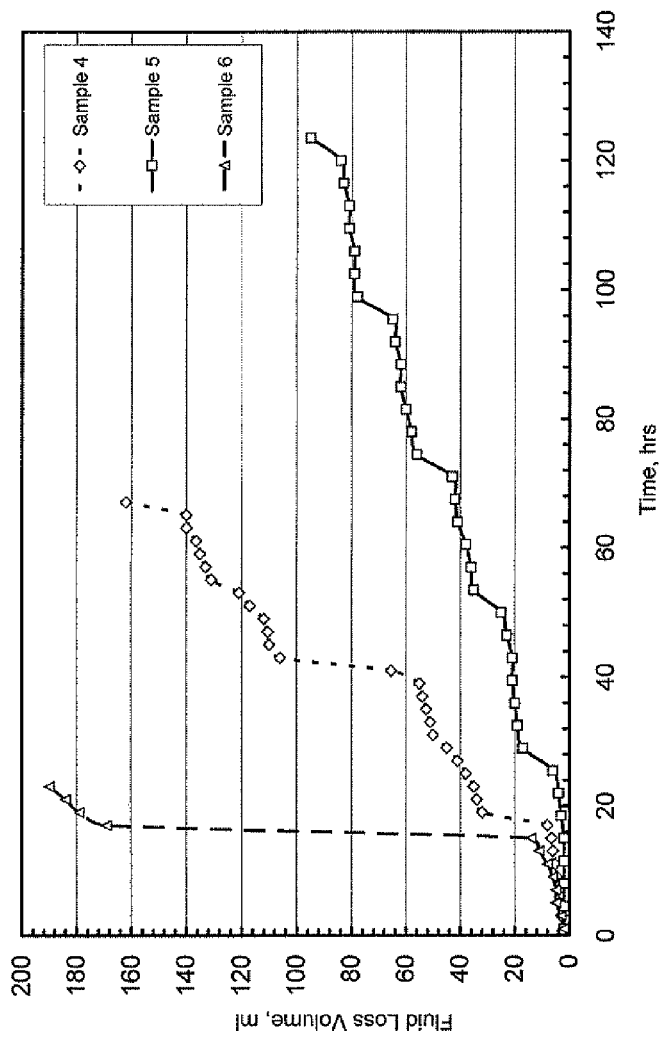
FIG. 2 provides a graph showing the fluid loss volume of various bimodal stimulation compositions added as a function of time according to embodiments of the present invention.
Figure 3:
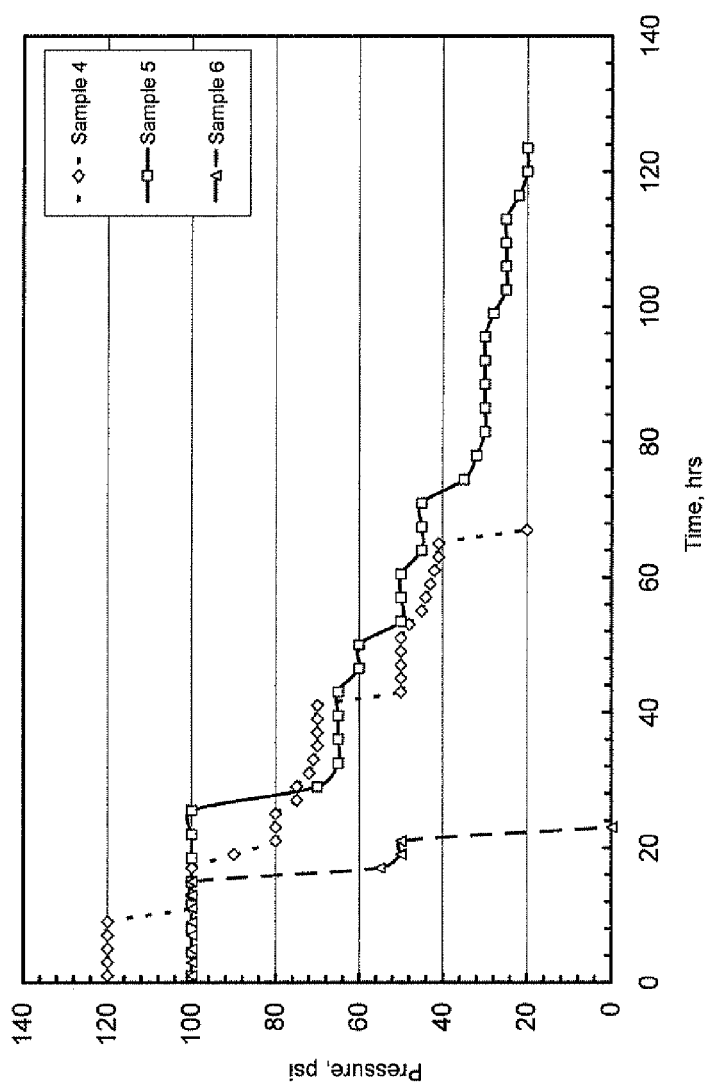
FIG. 3 provides a graph showing pressure decline as a function of time for various bimodal stimulation compositions according to embodiments of the present invention.

FIGS. 2 and 3 compare the performance of three different bimodal stimulation compositions under simulated reservoir conditions. The test was designed to simulate a high permeability reservoir at a constant temperature of approximately 90° C. The test was conducted with a high-pressure, high-temperature (HPHT) fluid loss cell (OFITE; Houston, Tex.). Three different compositions were tested. Sample 4 had a composition of approximately 5% by weight formic acid; 5% by weight KCl; and 7.5% by volume of the viscoelastic surfactant; Sample 5 had a composition of approximately 3% by weight formic acid; 5% by weight KCl; and 5% by volume of the viscoelastic surfactant; and Sample 6 had a compositions of approximately 6% by weight formic acid; 5% by weight KCl; and 5% by volume of the viscoelastic surfactant.

As shown in FIGS. 2 and 3, Sample 6, having the greatest acid concentration, removed the simulated filter cake at a faster rate than did either Samples 4 or 5, as indicated by the rapid decrease in pressure and the rapid increase in volume after approximately 15 hours. In contrast, Sample 5, having the lowest concentrations of both acid and the viscoelastic surfactant, demonstrated the slowest rate of the removal of the simulated filter cake.

Figure 4:
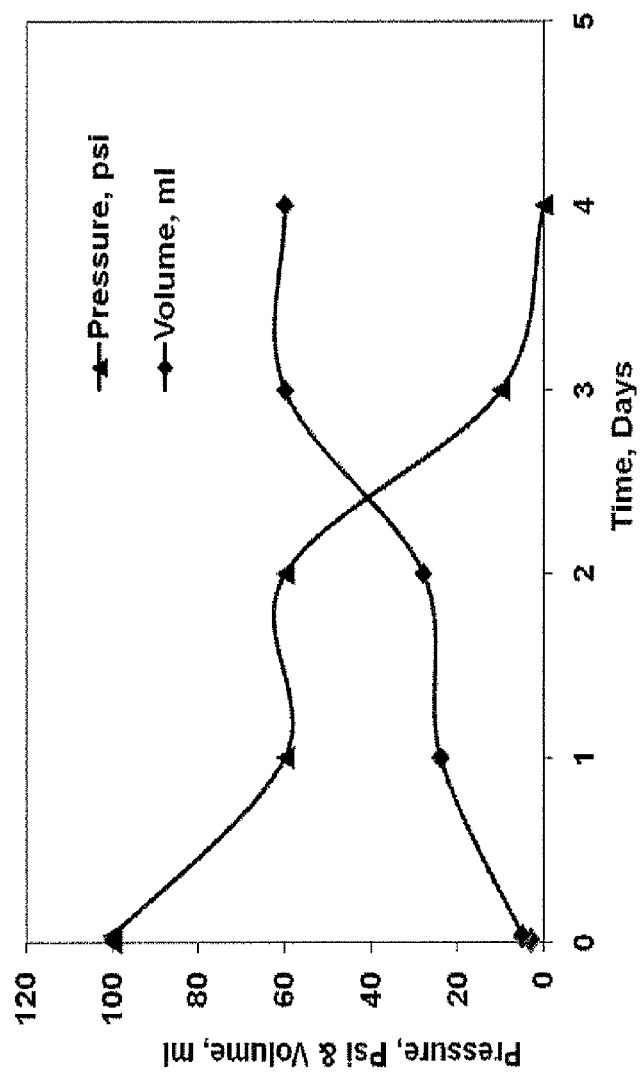
FIG. 4 provides a graph showing the removal of a simulated filter cake with a bimodal stimulation composition according to one embodiment of the present invention.

In another example, tests were conducted to simulate the reaction of an exemplary bimodal stimulation fluid composition under reservoir conditions. The test was designed to simulate a hot (T>200° F.), high permeability reservoir. The test was conducted with a high-pressure, high-temperature (HPHT) fluid loss cell (OFITE; Houston, Tex.). Reservoir water based mud was used to generate a filter cake in a standard HPHT fluid loss cell under a differential pressure of about 100 psi and a temperature of about 220° F. As shown in FIG. 4, over a period of 4 days, internal differential pressure gradually decreased and the volume of filtered fluids increased, thereby indicating extended delay in the reaction rate (and therefore, the removal of filter cake), and reduced fluid loss through the formation rock. It took this composition about 4 days to penetrate through the filter cake and cause circulation loss.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That which is claimed is:

1. A bimodal stimulation composition for use in a wellbore for controlled removal of filter cake present in a target production zone and for fluid loss prevention, the bimodal stimulation composition consisting of:
   3% by weight formic acid;
   15% by weight hydrochloric acid;
   a betaine surfactant comprising an alcohol group with between 2 and 4 carbon atoms; and
   3% to 5% by weight potassium chloride;
   where the bimodal stimulation composition is operable to remove filter cake in the target production zone over a period of at least 24 hours, and
   where the viscosity of the bimodal stimulation composition during the extended reaction time increases such that fluid loss from the target production zone is minimized.

2. The bimodal stimulation composition of claim 1 wherein the betaine surfactant is present in an amount of between about 3% and 10% by volume.

3. The bimodal stimulation composition of claim 1 wherein the bimodal stimulation composition has a pH in a range of about 0 to 5.

* * * * *